United States Patent [19]

Noble

[11] 4,421,274

[45] * Dec. 20, 1983

[54] LAND IRRIGATION SYSTEM AND METHOD

[75] Inventor: Allen T. Noble, Boise, Id.

[73] Assignee: Noble Linear Irrigation, Inc., Boise, Id.

[ * ] Notice: The portion of the term of this patent subsequent to Oct. 20, 1998 has been disclaimed.

[21] Appl. No.: 366,097

[22] Filed: Apr. 6, 1982

Related U.S. Application Data

[63] Continuation of Ser. No. 170,072, Jul. 18, 1980, abandoned, which is a continuation of Ser. No. 887,792, Mar. 17, 1978, abandoned.

[51] Int. Cl.³ ................................................ B05B 3/18
[52] U.S. Cl. .................................... 239/183; 239/711; 239/721
[58] Field of Search ............... 239/178, 183, 184, 711, 239/719, 720, 721; 137/615, 614.02, 614.06; 285/DIG. 25

[56] References Cited

U.S. PATENT DOCUMENTS

| | | | |
|---|---|---|---|
| 3,444,941 | 5/1969 | Purtell | 239/183 |
| 3,680,591 | 8/1972 | Vik | 137/614.06 |
| 3,729,016 | 4/1973 | Von Linslowe | 239/711 |
| 3,902,668 | 9/1975 | Daugherty | 239/184 |
| 3,970,102 | 7/1976 | Harvey | 239/183 |
| 4,159,080 | 6/1979 | Standal | 239/183 |

FOREIGN PATENT DOCUMENTS

| | | | |
|---|---|---|---|
| 434918 | 11/1974 | U.S.S.R. | 239/183 |
| 727181 | 4/1980 | U.S.S.R. | 239/183 |

*Primary Examiner*—John J. Love
*Assistant Examiner*—Michael J. Forman
*Attorney, Agent, or Firm*—James L. Bean

[57] ABSTRACT

A land irrigation system in which a continuously traveling sprinkler line is supplied with water from spaced risers mounted on a stationary water supply conduit extending in the direction of the movement of the sprinkler line to continuously supply water to the sprinkler conveyance, carrying a rotating water manifold with three rigid water carrying arms extending from the manifold at 120° to each other for successive connection to water outlet valves on the risers, moves along the water supply conduit. The outlet from the manifold is connected to the inlet of the sprinkler line through a conduit having a swivel joint whereby the manifold and rigid arms can rotate through 360° relative to the inlet of the sprinkler line. The inlet end of each rigid arm has a coupling device for coupling with outlet valve of a riser and for opening and closing the riser outlet valve. One rigid arm is fluidly coupled to the supply line at all times. With one coupling device connected to one riser, movement of the conveyance along supply line can be utilized to cause the manifold and rigid arms to rotate around the connected riser and also relative to the conveyance to bring another coupling device into contiguity with the next riser in the direction of conveyance travel. The manifold and sprinkler swivel connection move away from and toward the stationary supply conduit to accommodate the length of the rigid arm as it rotates around the connected riser.

7 Claims, 21 Drawing Figures

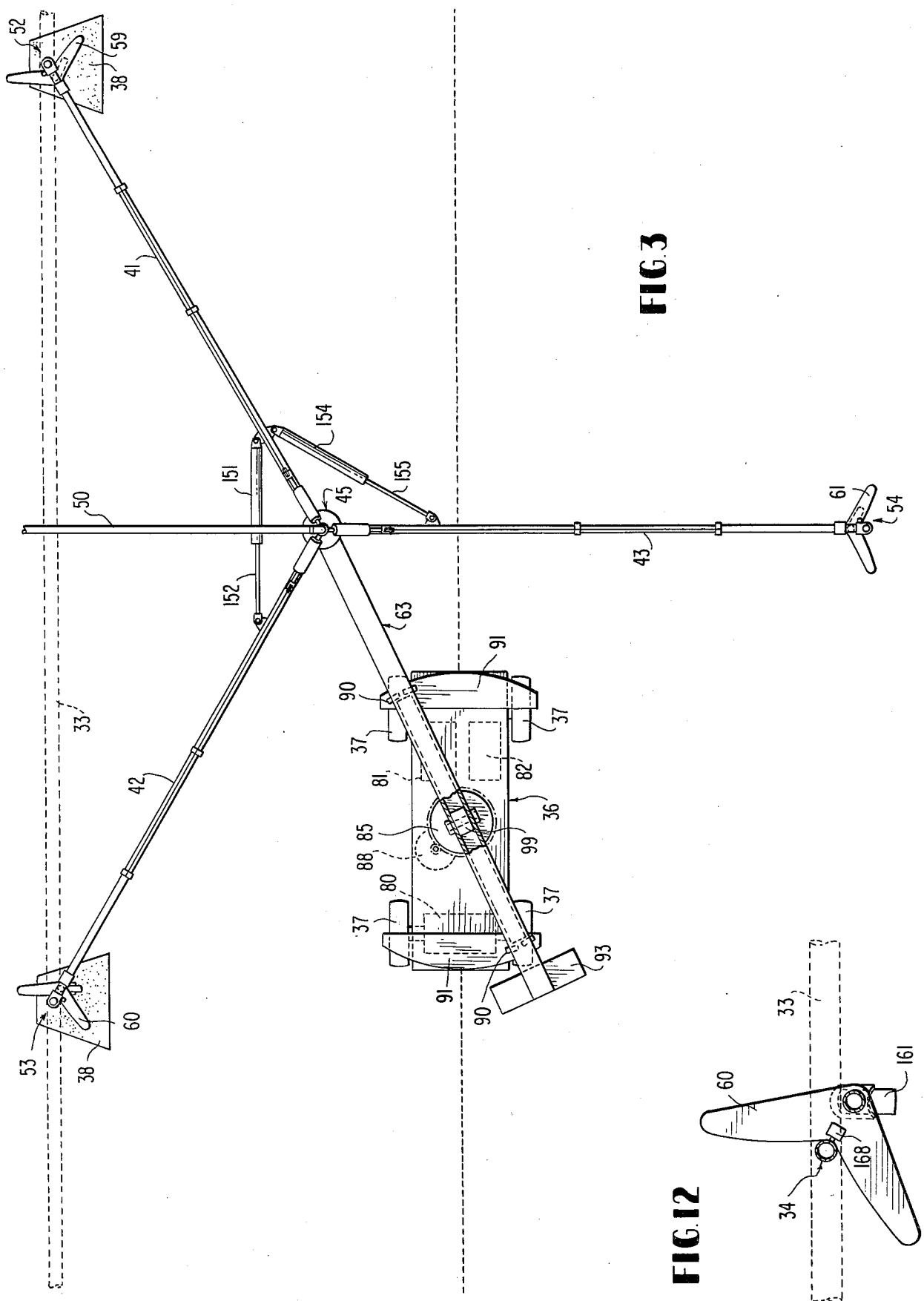

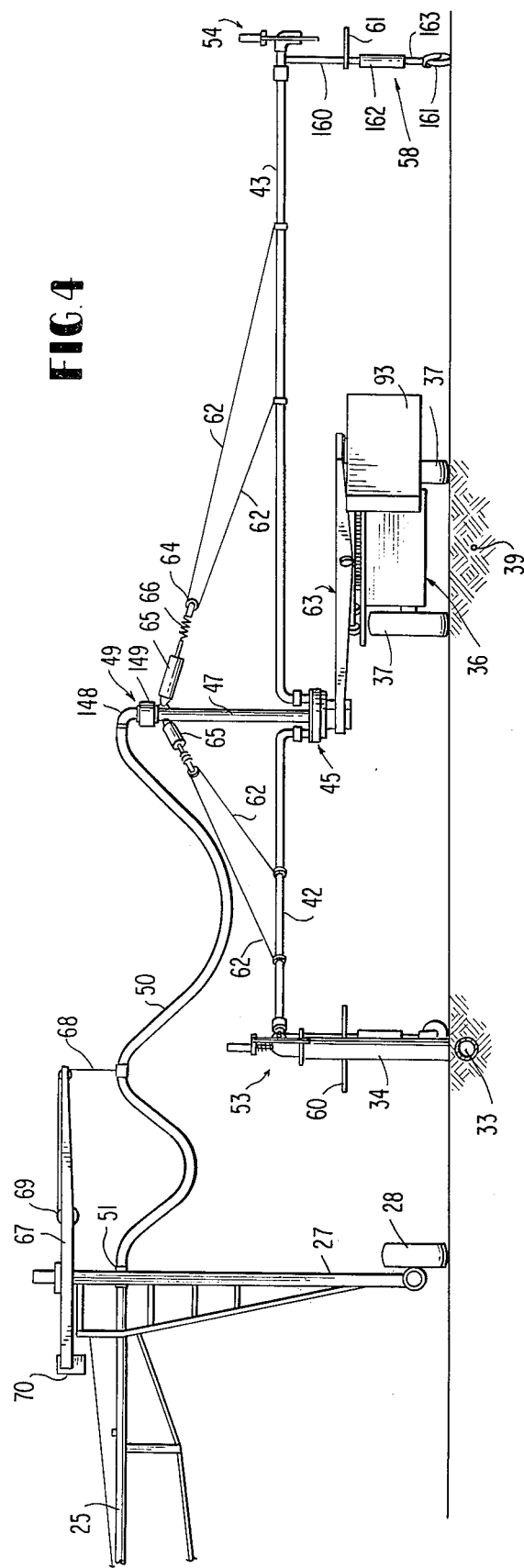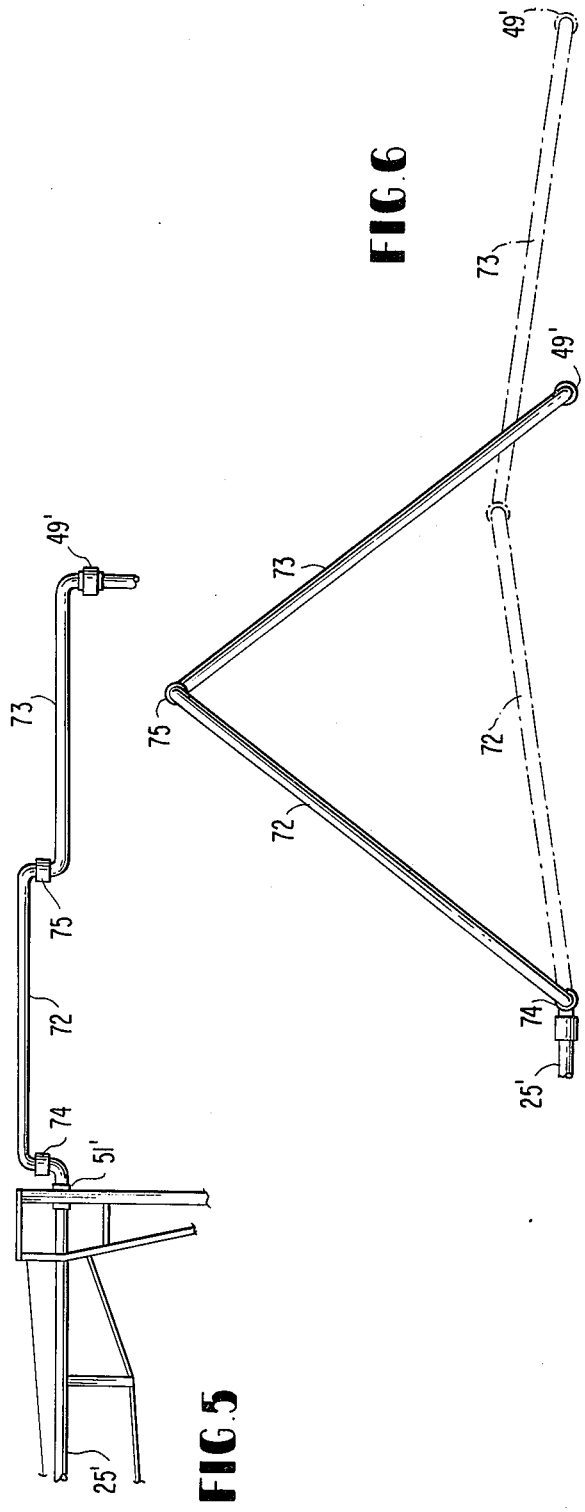

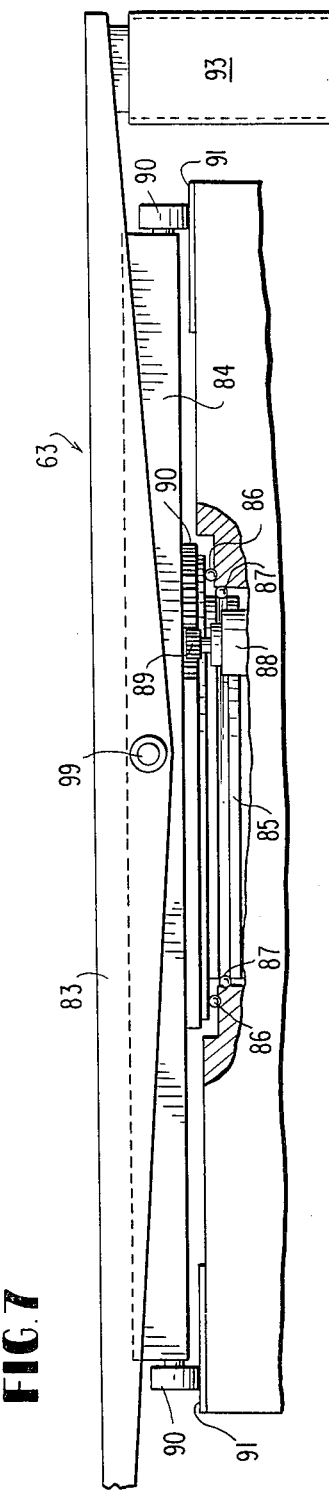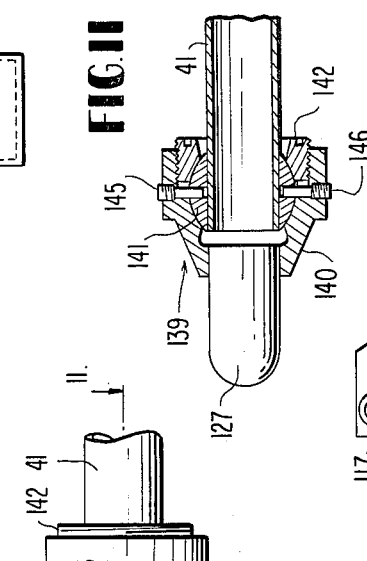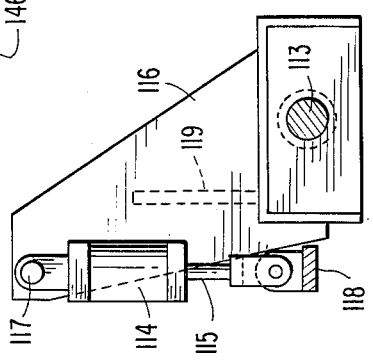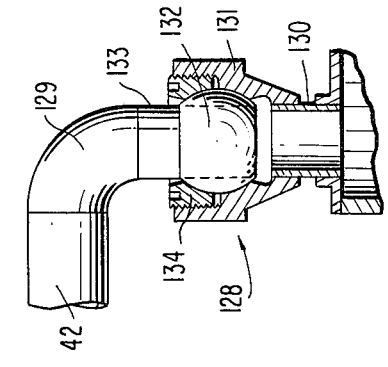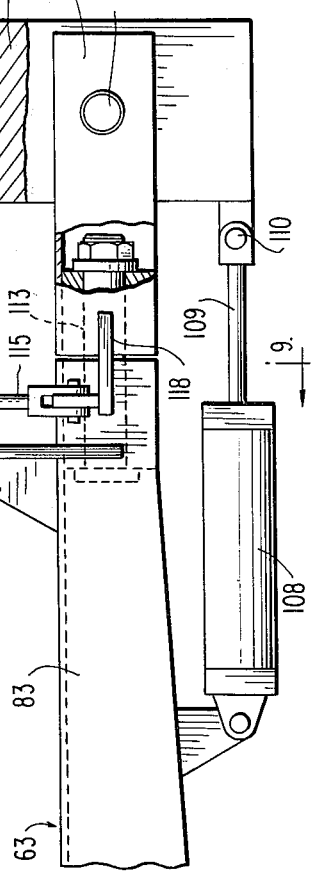

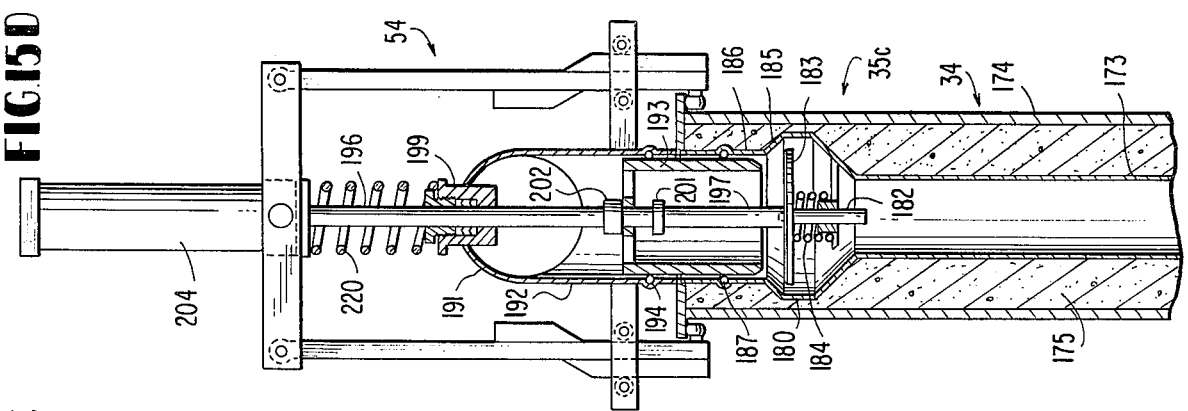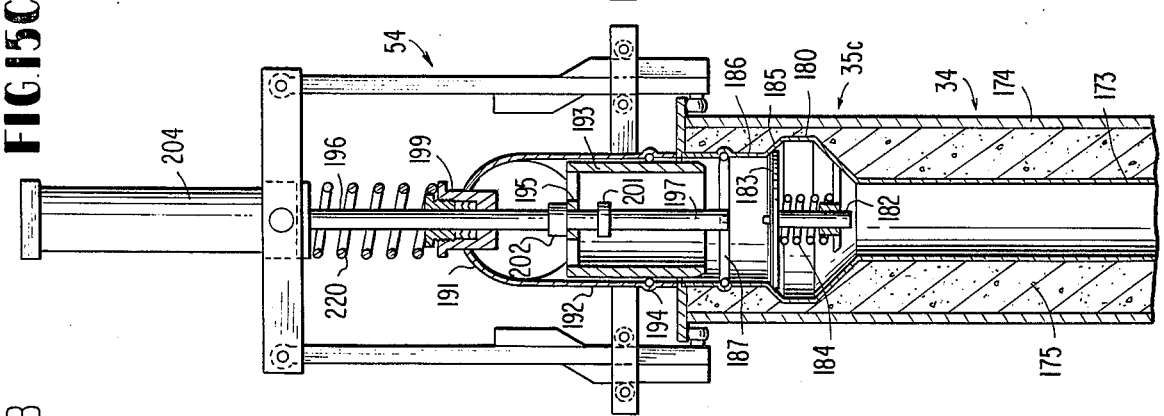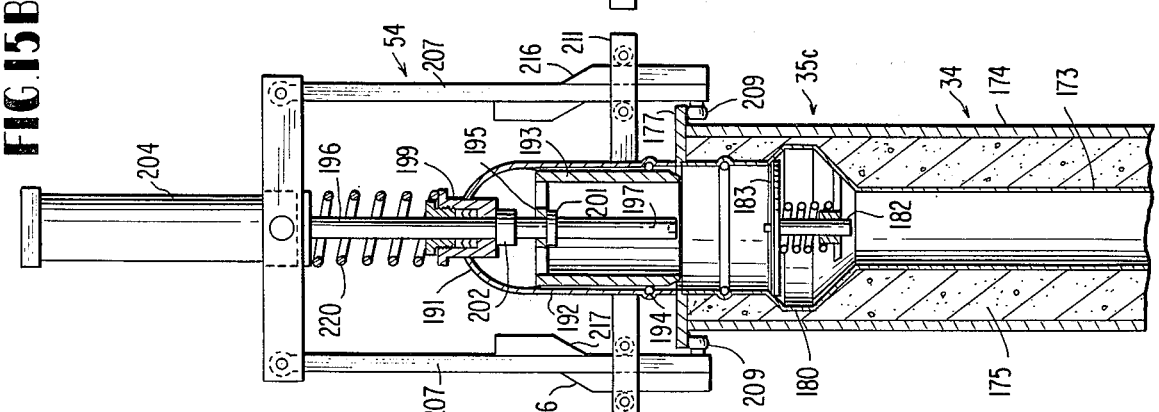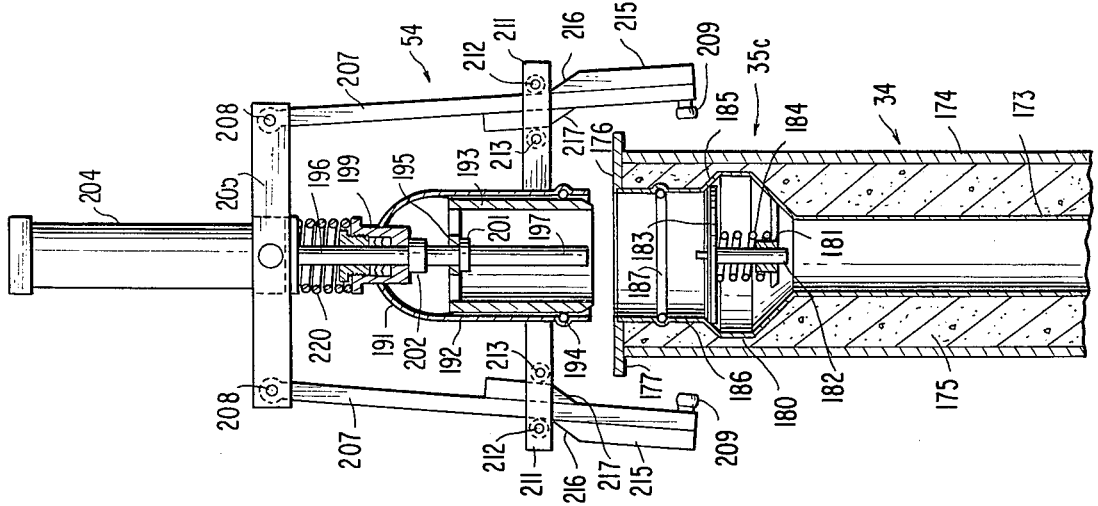

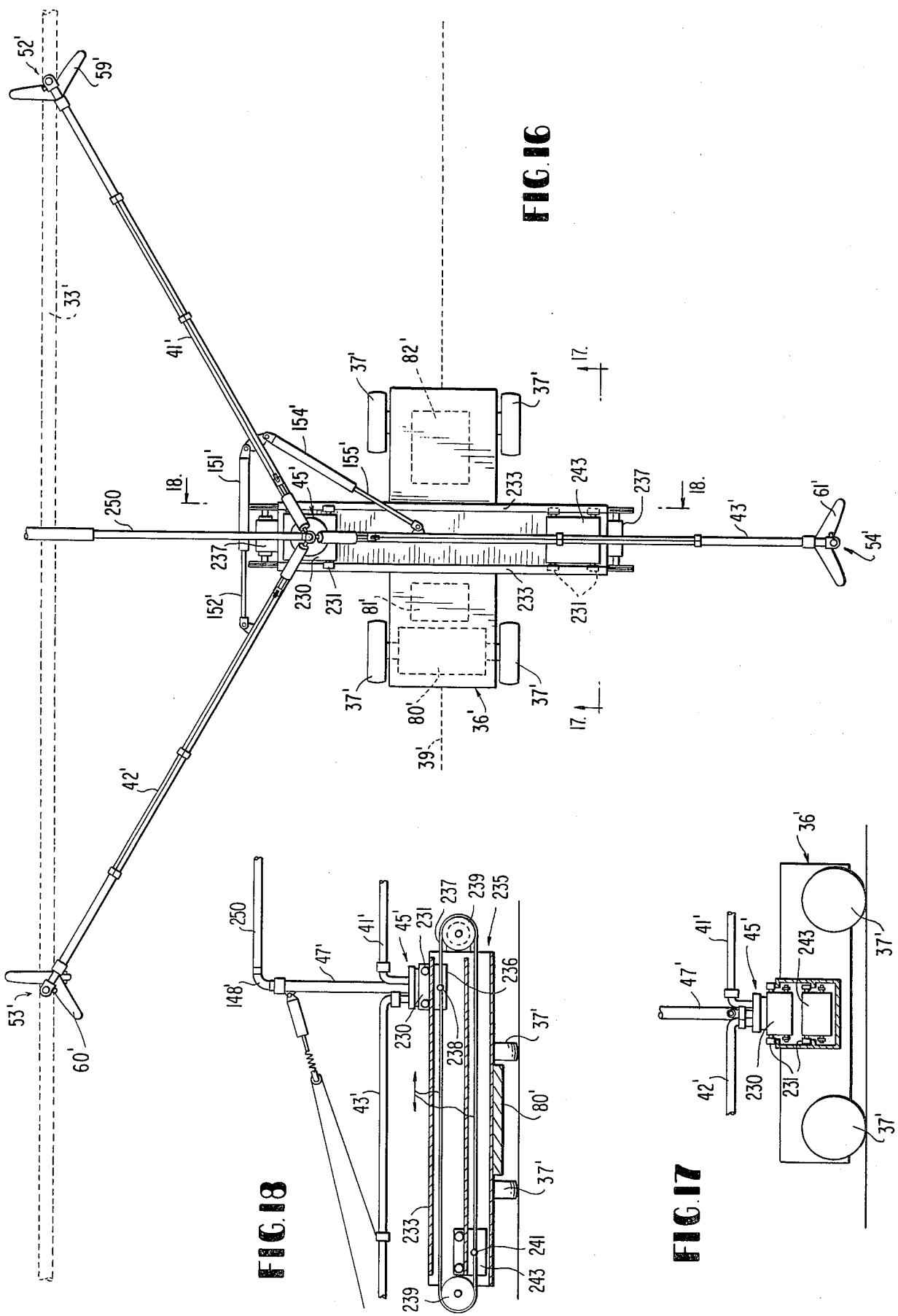

LAND IRRIGATION SYSTEM AND METHOD

This is a continuation application Ser. No. 170,072, filed July 18, 1980, now abandoned as a continuation of application Ser. No. 887,792 filed March 17, 1978, now abandoned, the entire disclosure of which is incorporated herein by reference.

BACKGROUND OF THE INVENTION

When irrigating extensive areas of land, long sprinkler lines have been used for some time. Water has been supplied to these lines from buried pipes called main lines with spaced risers projecting above the surface of the ground for connection to the sprinkler lines. Each time a sprinkler line had to be moved, manual labor was required for this purpose. This was a laborious and time consuming operation. As time went on, the sprinkler lines, which can reach a length of a quarter of a mile and more were fitted with wheels to make them easier to move. Eventually, power was supplied in one way or another to the wheeled lines to keep them moving slowly along the desired path parallel to the direction of the main line with flexible hoses extending between the water inlet end of the sprinkler lines and the riser to which the sprinkler line was connected. Since the main line can be eight or more inches in diameter with the water pressure in the main line high, the required size and strength of the flexible hoses became extremely burdensom in manual operation. Proposals were therefore made to facilitate connection of the sprinkling lines to successive risers with the least manual effort. Three examples of such proposals are illustrated in Engel U.S. Pat. No. 2,740,228, Stafford U.S. Pat. No. Re. 26,285 and Smith et al. U.S. Pat. Nos. 3,381,893 and 3,446,434. Such proposals provided for intermittent connection of the sprinkler line to the main line utilizing power assisted mechanical devices as the hoses or telescoping pipes were moved from riser to riser, with the sprinkler line continuing to move along at the desired constant rate.

In order to provide for a continual source of water to the sprinkler line Rogers U.S. Pat. No. 3,463,175 and Standal U.S. Pat. No. 4,036,436 proposed systems in which one riser is always connected to the sprinkler line, this being accomplished by having pipe or hose connections to the sprinkler line connect with devices which span three risers. By this arrangement, the forward part of the device is disconnected from one riser and goes on to a second riser ahead of the first riser and on connection of the device with the second riser, the hindmost part of the device, which has been connected to a third riser which is behind the first riser in the main line, moves up to connect with the first riser. As far as known to the applicant, these proposals were never put into use. In addition to requiring closely spaced risers, the mechanical problems associated with these systems appear to have ruled out their use.

Von Linsowe U.S. Pat. No. 3,729,016 discloses another form of system for continuously feeding the water to a sprinkler line, but this system requires twin main lines since the twin coupling devices for connecting the sprinkler line to the main line cannot pass each other. This proposal appears to have the same history in practice as the Rogers and Standal systems.

In the system of the present invention, the faults and disadvantages of the prior systems have been eliminated by the provision of a plurality of rigid pipes or water carrying arms arranged for successive coupling with novel valves in succeeding risers on a main line by virtue of these arms having their water outlets connected to a rotatable water manifold carried along the length of the water main by a conveyance, the water outlet of the rotatable water manifold, being connected to the water inlet end of the sprinkler line through a swivel joint conduit. The conveyance carries the apparatus along and since a single water carrying arm is connected to a single riser at any one time, movement of the conveyance causes or assists the pipes and water manifold to rotate and thereby bring the arms successively into coupling relationship with successive risers along the main line. Thus, continuous water flow is achieved between the water main line and the sprinkler line without the mechanical and functional difficulties of prior systems.

SUMMARY OF THE INVENTION

For use in connection with a land irrigating system in which a moving water sprinkler means having water inlet means at one point extends laterally to and moves along the length dimension of a stationary water supply means having water outlet valve means spaced along the length thereof, an apparatus for successively connecting water outlet valve means of the stationary water supply means with water inlet means of the sprinkler means comprising conveyance means for moving along the length dimension of the stationary water supply means in unison with the moving sprinkler means, guiding means for constraining the conveyance means to movement in a direction coincident with or parallel to the direction of the length dimension of the stationary water supply means, water receiving chamber means carried by the conveyance means having water outlet means and a plurality of water inlet means, a plurality of elongated water conduit means having water outlet means, means associated with the water outlet means of each of the plurality of elongated water conduit means for connecting the water outlet means for water flow to the water inlet means of the water receiving chamber means, coupling means at one end of each elongated conduit means for successive water flow connection and disconnection with water outlet valve means on the stationary water supply means, means supporting the water receiving chamber means and the elongated water conduit means for rotation relative to the sprinkler means water inlet conduit, and water conduit means for rotatably connecting the water outlet means of the water receiving chamber means and the sprinkler menas water inlet means for water flow from the water receiving chamber means to the sprinkler means water inlet means.

In connection with land irrigation wherein a moving sprinkler means having a water inlet means at one point moves along the length of a stationary water supply means having water outlet valve means at spaced intervals along the length thereof, the method of successively connecting water outlet valve means of the stationary water supply means with water inlet means of the sprinkler means to obtain substantially continuous water supply to the sprinkler means comprising moving a conveyance means along the length dimension of the stationary water supply means, the conveyance means carrying a water receiving chamber having water outlet means rotatably connected to the water inlet means of the sprinkler means, the water receiving chamber also having a plurality of water inlet means, and elongated water conduit means, each elongated water conduit means having water outlet means at one end connected to the water inlet means of the water receiving chamber and each elongated water conduit means having a coupling means at the other end for successive water flow connection and disconnection with the water outlet valve means on the stationary water supply means, rotating the water receiving chamber means and the elongated water conduit means relative to the water inlet means of the sprinkler means to bring the coupling means of a first elongated conduit means into contiguity with a first water outlet valve means of the stationary water supply means while maintaining the coupling means of a second elongated water conduit means connected for water flow to the water outlet valve means of the stationary water supply means next adjacent to the first water outlet valve means in the direction opposite to the direction of movement of the conveyance means along the length of the stationary water supply means, rotatably connecting the coupling means of the first elongated conduit means and the first water outlet valve means for water flow and approximately simultaneously disconnecting the coupling means of the second elongated conduit means from the second water outlet valve means to stop water flow through the second elongated water conduit, moving a coupling means other than the first coupling means of an elongated water conduit means other than the first elongated water conduit means into contiguity with a third water outlet valve means next adjacent to the first water outlet valve means in the direction of movement of the conveyance means along the length of the stationary water supply means, such movement of the last mentioned elongated conduit means being brought about at least in part by utilizing interaction of the moving conveyance means along the length dimension of the stationary water supply and the rotatable connection between the coupling means of the first elongated conduit means and the first water outlet valve means to rotate the water receiving chamber means and the plurality of elongated water conduit means relative to the water inlet means of the sprinkler means, and rotatably connecting the coupling means of the elongated conduit means other than the coupling means of the first elongated conduit means and the third water outlet valve means for water flow and approximately simultaneously disconnecting the coupling means of the first elongated coupling means from the first water outlet valve to stop water flow through the first elongated water conduit means.

BRIEF DESCRIPTION OF THE DRAWINGS

FIG. 3 is a plan view of a portion of the arrangement of FIG. 2, enlarged to the greatest extent practical to show better the functioning parts of the system;

FIG. 4 is a view in side elevation of the system of FIG. 3 (plus a portion of the associated sprinkler line) viewed from the left-hand side of FIG. 3, i.e., with movement of the system toward the observer;

FIG. 5 is a view in side elevation similar to FIG. 4 of a modification of a component of FIG. 4;

FIG. 6 is a plan view of the modification of FIG. 5 with the component shown extended in dashed lines;

FIG. 7 is an enlarged fragmentary view with parts shown in section of coacting components appearing in FIGS. 3 and 4;

FIG. 8 is an enlarged fragmentary view in side elevation with parts in section and broken away of coacting components of the system illustrated in FIGS. 3 and 4;

FIG. 9 is a view in section taken along the line 9—9 of FIG. 8;

FIG. 10 is a view in vertical section of the universal pipe joint connection illustrated at the left-hand side of FIG. 8;

FIG. 11 is a veiw in horizontal section of the swivel pipe connection illustrated at the right-hand side of FIG. 8;

FIG. 12 is an enlarged plan view of one of the components shown in FIG. 3;

FIGS. 15a, 15b, 15c and 15d are views in section of the structure illustrated in FIGS. 13 and 14 with the operating parts shown in different functional positions;

FIG. 16 is a plan view similar to FIG. 3 of a modification;

FIG. 17 is a view in section taken on the line 17—17 of FIG. 16; and

FIG. 18 is a view in section taken on the line 18—18 of FIG. 16.

DETAILED DESCRIPTION OF THE PREFERRED EMBOIDMENTS AND METHOD

Embodiments of FIGS. 1 to 15

Figure 1:
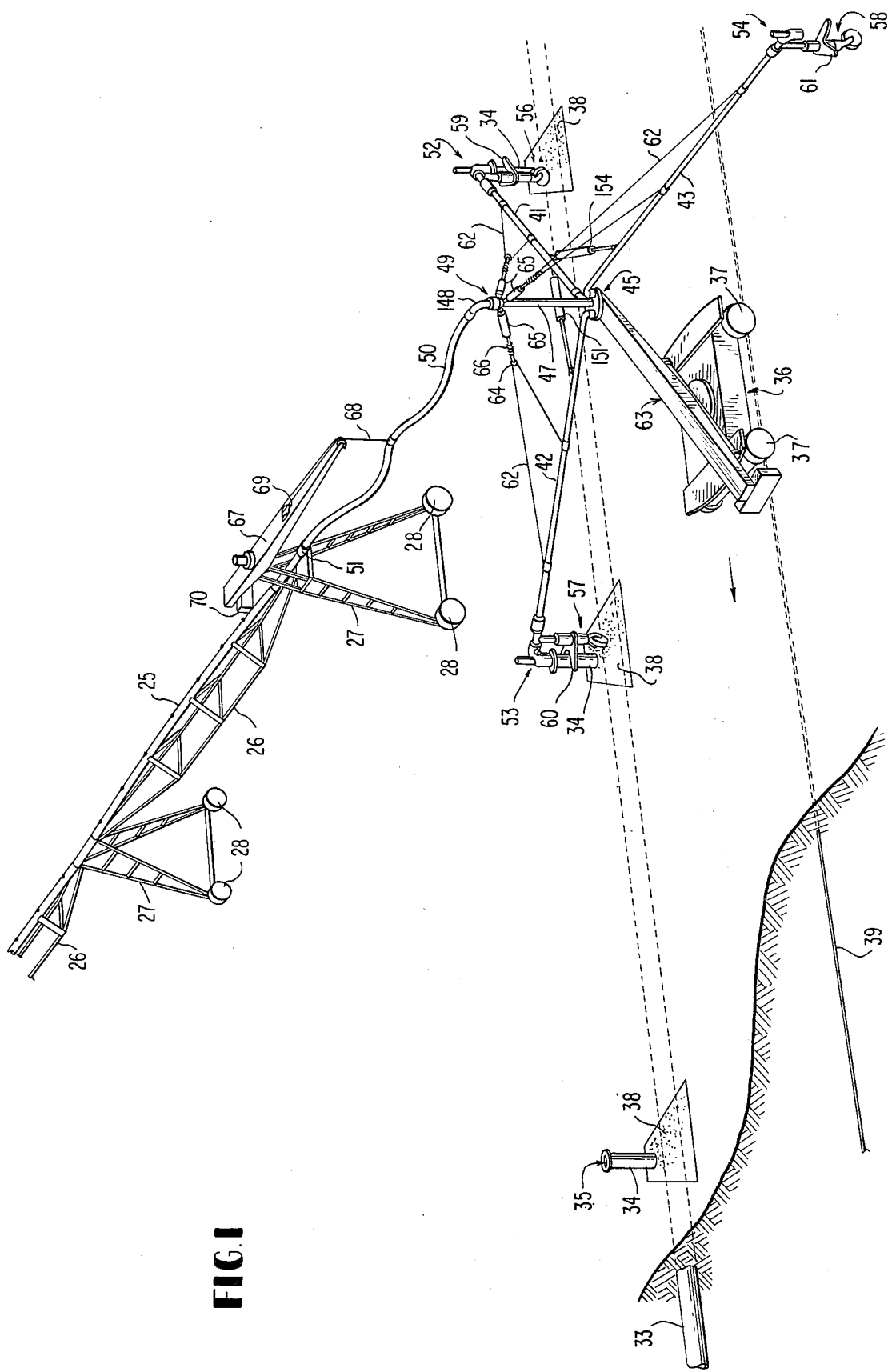
FIG. 1 is a perspective view of the system of the present invention connected to a sprinkler line with the subterranean water main line and conveyance guide line being partially exposed for clarity.

Referring to FIG. 1, reference numeral 25 indicates a water sprinkler line supported on trusses 26 and towers 27, the bases of the towers being mounted on wheels 28 which can be driven in synchronism by electric motors, not shown. Reference numeral 33 indicates an underground main line for supplying water to sprinkler line 25 through risers indicated generally at 34. Sprinkler line wheels 28 are so driven as to cause the sprinkler line to move slowly along the field to be irrigated in a direction parallel to the direction of main line 33. Normally closing the upper end of each riser 34 is a novel form of water outlet valve indicated generally at 35. A conveyance in the form of a tractor, indicated generally by reference numeral 36, having wide tread tired wheels 37 and driven by an internal combustion engine moves in the direction of the arrow along the length of the water main line. The tractor is guided by guide line 39 which is shown as an electrical conduit buried in the ground but any suitable type of known guidance system can be used. Also tractor 38 can be any suitable conveyance, for example, an additional tower 27 connected to the sprinkler line by another truss 26, which in any case will move along the main line at the same rate of speed as the sprinkler line, there being well-known means for assuring the synchronism of movement between the sprinkler line and the tractor or other conveyance. Tractor 36 carries a superstructure having components for cooperating sequentially with successive valves 35 of risers 34 so as to maintain a constant water supply to the sprinkler line. Where desired a concrete pad 38 having a level top surface is installed in the ground at the base of each rise pipe 34, the distance between the top level surface of the pad and the outlet valve being uniformly the same for all risers 34.

In the preferred embodiment of the present invention, the superstructure just referred to comprises three rigid water carrying arms or conduits 41, 42 and 43 which are all three connected for water flow at their inner or water outlet ends to a water receiving conduit function means or manifold indicated generally by the reference numeral 45. In turn a water outlet orifice of water receiving manifold 45 is connected to a structurally rigid water flow pipe or conduit 47 and the upper portion of water flow pipe 47 is in water flow connection through a swivel pipe or conduit indicated generally at 49 with the water inlet end of a flexible hose or connecting water conduit 50 connected to the inlet 51 of the water sprinkler line. At their outer ends, elongated water carrying conduits or arms 41 having coupling or connection devices indicated generally by the reference numerals 52, 53, 54 which are designed to successively couple or connect with successive riser valves 35 in the direction of tractor and sprinkler line movement. Each water carrying arm 41, 42 and 43 also has at its outer end a wheeled support structure indicated generally at 56, 57, 58, respectively and a riser pipe locator 59, 60 and 61, respectively. Each water carrying arm is resiliently supported by a cable arrangement comprising a cable 62 passing around a pulley 64, the pulley being connected to a hydraulic cylinder 65 through a tension spring 66.

All the structure just described is carried on one end of a boom or rigid structural member indicated generally by reference numeral 63 which can rotate relative to the tractor around an intermediate point in the boom in order that the tractor can follow a straight line while the boom accommodates movement of manifold 45 along arcs the centers of which are consecutive risers 34 to which the outer ends of arms or elongated water carrying conduits 41, 42 and 43 are consecutively connected, as will be described below.

Figure 2:
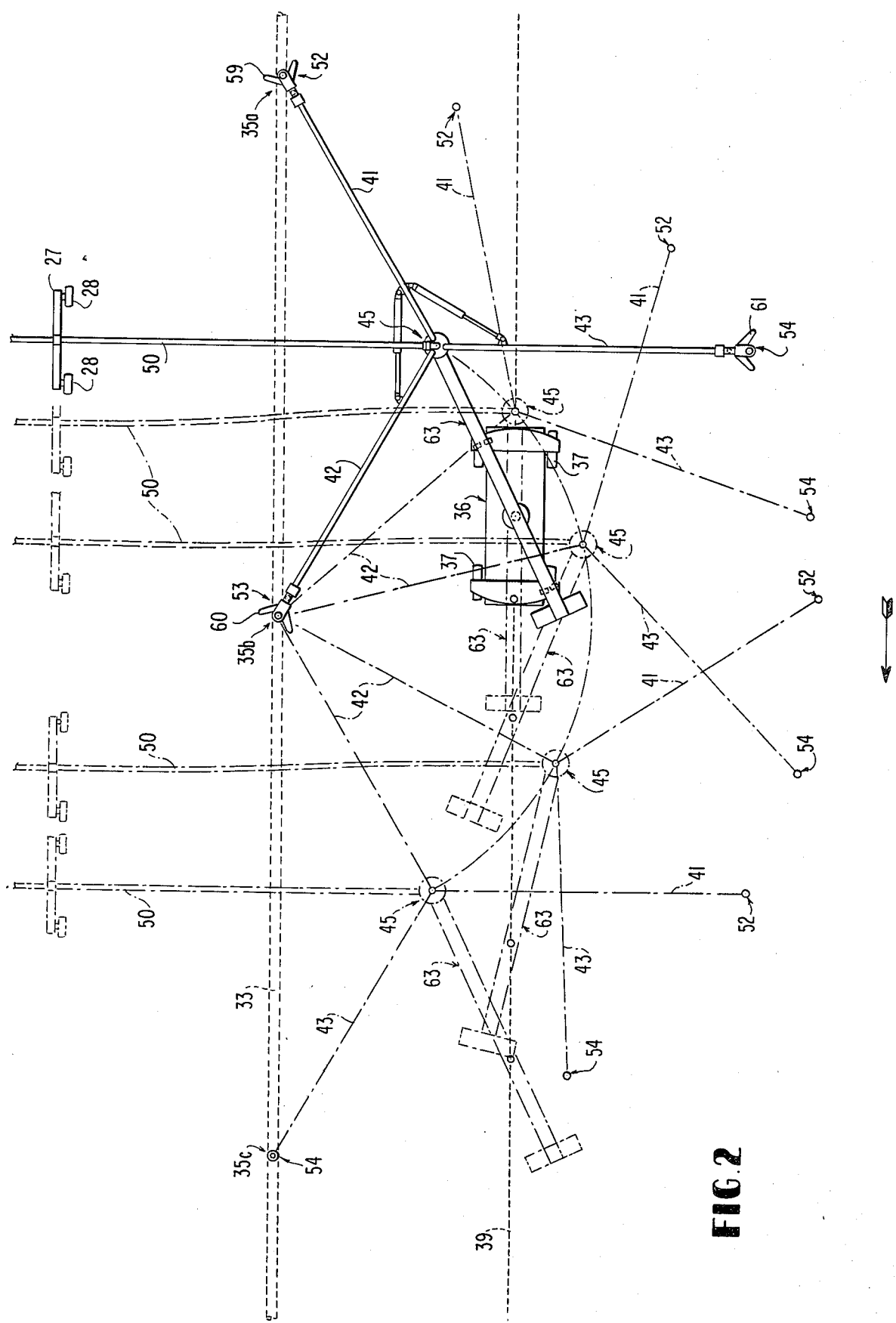
FIG. 2 is a plan view of the system of the invention in association with a sprinkler line with successive positions of the system diagrammatically illustrated in dashed lines.

Referring now to FIG. 2, the general mode of operation of the system and method illustrated in FIG. 1 is diagrammatically illustrated. Three representative riser water outlet valves are shown at 35a, 35b and 35c with the superstructure on tractor 36, i.e., the water outlet valve connecting apparatus of the present invention, shown in solid lines, with coupling means 52 in water flow and rotatable connection with riser 35a and coupling means 53 about to make water flow and rotatable connection with water outlet valve 35b. With the tractor and the sprinkler line moving to the left in this figure, four successive intermediate positions of the tractor 36, its superstructure and sprinkler line 30 are indicated in phantom, for carrying the structure from water flow connection with riser outlet valve 35a to water flow connection with riser outlet valve 35b approximately simultaneously with disconnection from riser water outlet valve 35a and ultimately into contiguity with riser water outlet valve 35c for water flow and rotatable connection therewith. The various positions of coupling means 52, 53 and 54 and the main boom 63 will be apparent from the several phantom representations.

Referring now to FIGS. 1 and 3 to 12, a more detailed description will be given of the overall structure for sequential connection of the main line risers to the sprinkler line.

It will be seen that the flexibility of hose 50 is accommodated by the hose being supported at an intermediate point along its length by a pivoted arm 67 and a cable 68 paid off from a spring tensioned drum 69, the tension on drum 69 being such as to hold the hose in the position pictured when water receiving manifold 45 is closest to the path of the sprinkler line as seen in FIG. 4. A counterweight for arm 67 is shown at 70. The give and take of cable 68 on drum 69 plus the horizontal swinging movement of arm 67 accommodate the movements of hose 50 as water receiving manifold 45 moves from the position closest to the path of the sprinkler line to a position farthest therefrom.

Instead of hose 50, an articulated rigid pipe with swivel connections can be used as shown in FIGS. 5 and 6 wherein the pipe sections 72, 73 are connected together and to the sprinkler line 30 by swivel joints 74, 75 and at the outer end to swivel connection 49. In these figures where the components are the same as in FIG. 5, the reference numerals are primed.

In FIG. 3, certain functional components of tractor 36 are indicated in phantom box form since the operating elements of these components are well know in the art and per se form no part of the present invention. Reference numeral 80 designates an internal combustion engine which acts as the prime mover for an electric generator 81 which supplies motive power to electric motors (not shown) for driving the tractor and the sprinkler line. Rectangle 82 represents a collection of electronic components for control of the various automatic functions of the system in a manner well known in the art.

In describing the overall combination it was mentioned that water receiving manifold 45 is supported on the end of a boom indicated generally at 63 which comprises an elongated rigid structural member 83 and a supporting rigid structural base member or undercarriage 84, the latter being supported for rotation around a pivot bearing member 85, best shown in FIG. 7. Pivot member 85 is supported for rotation around a vertical axis by ball bearings 86 and is held against lateral thrust forces by ball bearings 87. The weight of the superstructure while rotating in the horizontal plane on undercarriage 84 is supported on rollers 78 journaled in the undercarriage and associated trackways 75 carried by the tractor body structure. Rotation of undercarriage 84 and boom 63 on bearing 85 will be actuated by movement of tractor 36 along guide line 39 due to coupling member 53 being attached to and rotatable in respect to the associated riser 34, coupling member 52 having been uncoupled. In order not to overstress the riser members it may be desirable to have an assist mechanism for this rotation of the superstructure and for this purpose electric motor 88 can drive a pinion gear 89 which in turn meshes with and drives a ring gear 90 on pivot member 85.

In addition to rotating in substantially a horizontal plane, boom 63 also is pivoted for rocking motion in a vertical plane by means of pivot pin 99 supported on undercarriage 84. Pivot 99 is deemed advisable in view of differences in ground level in the path of tractor 38 and the resultant roll and pitch of the tractor body structure.

Since water receiving manifold 45 and the associated water carrying arms, 41, 42 and 43 are cantilevered over the rear end of tractor 36, provision is made to achieve a smoothly working structure by providing counterweight 93 at the opposite end of boom 63.

Further provision is made for relative movement of water receiving manifold 45 and the remainder of the superstructure it supports relative to boom 63 by a pair of pivots at the water receiving manifold end of the boom. Since it is advisable to control these movements, hydraulic cylinders and pistons are provided in connection with these pivots. Looking at FIGS. 8 and 9, in respect to pivotal movement of water receiving manifold 45 and associated structure in a vertical plane including the length dimension of the boom, a bifurcated element 105 is appended to the end of the boom structural member 83 with pivot pin 106 supporting an underbody member 107 forming a support for water receiving manifold 45. This pivotal movement in a vertical plane including the length dimension of boom 63 around pin 106 is controlled by hydraulic cylinder 108 and piston rod 109, pivotally linked at 110 to underbody member 107. In turn bifurcated element 105 is supported on the end of boom structural member 83 by a pivot pin 113 for rotary movement in a vertical plane normal to the length dimension of boom 63. Control of this pivotal movement is accomplished through the provision of hydraulic cylinder 114 and piston rod 115, the cylinder being pivotally connected at one end on pin 117 carried by plate 116 mounted on the end of boom structural member 83. A gusset 119 braces plate 118. The free end of piston rod 115 acts on bifurcated member 105 through a lug 118 carried by member 105.

It will be understood from the description thus far that water receiving manifold 45, in the preferred embodiment, supports water carrying arms 41, 42, 43, pipe 47 and swivel conduit 49, all constituting an integrated structure for bringing coupling members 52, 53 and 54 into consecutive water flow connection with risers 34 through the medium of the special valves in risers 34 and cooperating valve openers in the coupling members. This structure will now be described in more detail.

Underbody member 107 rotatably supports water receiving manifold 45 on opposed horizontal and vertical bearing surfaces forming raceways for receiving ball bearing elements 120 and 121 respectively. Water flow structural pipe 47 is rigidly mounted on the casing 124 of water receiving manifold 45. Water carrying arm 41 is mounted for pivotal movement only in a vertical plane including its longitudinal axis in respect to water receiving manifold 45 through a short pipe section 126, an elbow 127 and a pivotal conduit connection indicated generally at 139. On the other hand water carrying arms 42 and 43 are each swivelly mounted in respect to water receiving manifold 45 for movement in the horizontal and vertical planes by a pivotal conduit connection, indicated generally at 128. The details of these connections are shown in respect to water carrying arms 42 and 41 in FIGS. 10 and 11, respectively. The outlet end of water carrying arm 42 (and water carrying arm 43) is connected to water receiving manifold 45 through a pipe elbow 129 but in this case there is a swivel pipe or conduit connection between pipe elbow 129 and water receiving manifold 45 which permits water carrying arm 42 rotational movement in a horizontal plane and limited rotational movement in all vertical planes. This is by virtue of a fitting which is made up of a water outlet pipe or conduit 130 rigidly carried by the water receiving manifold casing 124 and in turn supporting a housing 131 having a partially spherical inwardly-facing inner wall which receives a complementarily shaped partially spherical bearing surface 132 rigidly carried by a short section of pipe 133, rigidly fitted to elbow 129. A gland nut 134 compresses a packing (not shown) and holds these parts in operative relation. Since water carrying arms 41, 42 and 43 are at least partially and resiliently supported by cables 62 to the top of structural pipe 47, it will be seen that water carrying arms 42 and 43 are normally supported against extreme movement downwardly in stable and adjustable relationship heightwise relative to the swivel conduit connections at 128.

It has already been mentioned that water carrying arm 41 does not rotate in the horizontal plane relative to water receiving manifold 45 but it is necessary that provision be made for rotating movement in the vertical plane and the limited movement pivotal conduit connection indicated generally by reference numeral 139 is provided for this purpose. FIG. 11 is a horizontal section through this pivotal connection fitting and shows a housing 140 with a partial spherical bearing surface facing inwardly and coacting with a partial spherical surface 141 carried by the end of water carrying arm 41. A packing gland nut 142 compresses a packing (not shown) to seal this pivotal connection. Pins 145 and 146 passing through housing 140 and coacting with partial spherical member 141 confine this pivotal action to movement in a vertical plane.

Between hose 50 and vertical structural pipe 47 there is a pivotal conduit member indicated generally at 49 which comprises a swivel connection larger but otherwise corresponding to swivel conduit member 128 already described, with a pipe elbow 148 corresponding to pipe elbow 129 and a housing 149 corresponding to housing 131 of swivel member 128. Thus a view in vertical cross section of swivel member 49 would correspond to that of swivel member 128 and a repetition of its description is unnecessary.

Water carrying arm 41 is designed to swing only in the vertical plane so that this arm can act as a reference point in relative movement of the three arms. To achieve a resilient connection in this respect a pair of opposed springs in cylinder 151 act on associated piston rod 152 to resiliently position arm 42 relative to arm 41 so that the angle between these two arms can vary slightly when forces acting on couplings 52 and 53 so require. In the same way, a pair of opposed springs in cylinder 154 acting on associated piston rod 155 act to position arm 43 resiliently relative to arm 41 so that the angle between arms 41 and 43 can vary slightly when desired. Obviously arms 42 and 43 are thus resiliently positioned relative to one another. It will be seen from FIG. 2 that as the apparatus moves along guide line 39 a point will be reached where with coupling member 53 rotatably connected to outlet valve 35b, coupling means 54 may require slight movement in the horizontal plane for alignment with the associated outlet valve 35c. In such case piston rods 152 and 155 acting against each other through cylinders 151 and 154 and against arm 41 will permit resilient movement between water carrying arms 42 and 43 to thereby arrive at the desired position of coupling member 54 in relation to outlet valve 35c in FIG. 2.

The arm outboard structure 58 for each arm is made up of a vertical structural member 160, wide tired wheel 161 and a shock absorbing cylinder 162 connecting these parts with the piston rod of the cylinder acting on the mounting structure of wheel 161. The mounting structure of wheel 161 is designed to constrain the wheel to act as a castor.

Since a short interval of time elapses from the time locator member 61 brings coupling member 54 into contiguity with outlet valve 35c until the coupling member is in position to open outlet valve 35, a time-delay mechanism 168, as shown in FIG. 12, is included to delay operation of the valve operating member.

Figure 13:
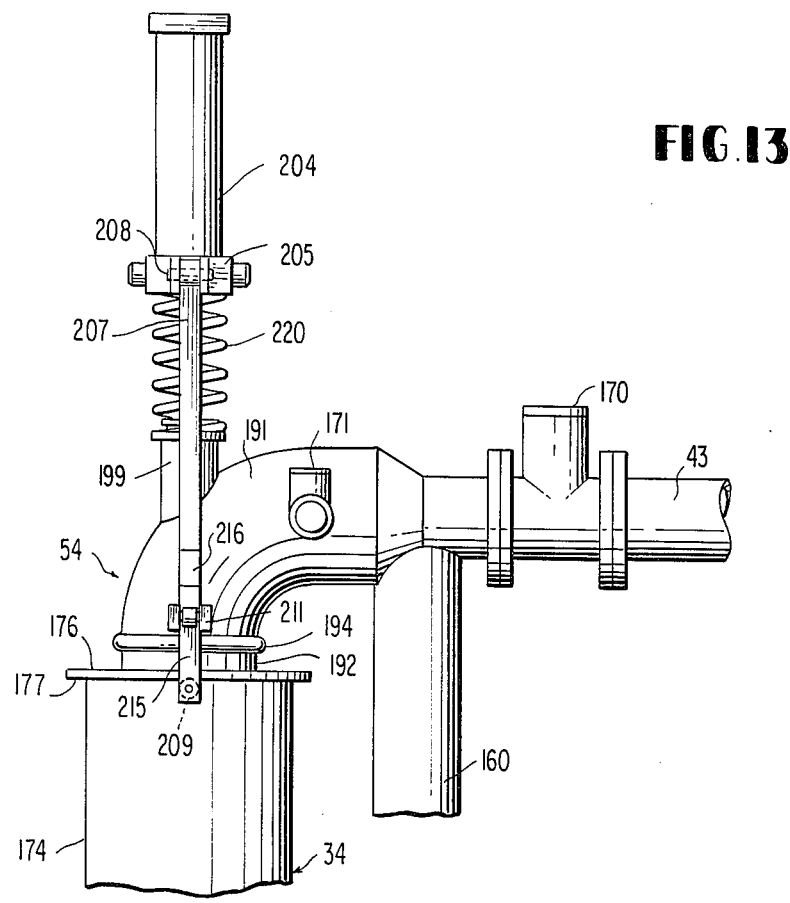
FIG. 13 is an enlarged view in elevation of one of the three identical structures at the outer ends of the three arms illustrated in FIGS. 1, 3 and 4.
Figure 14:
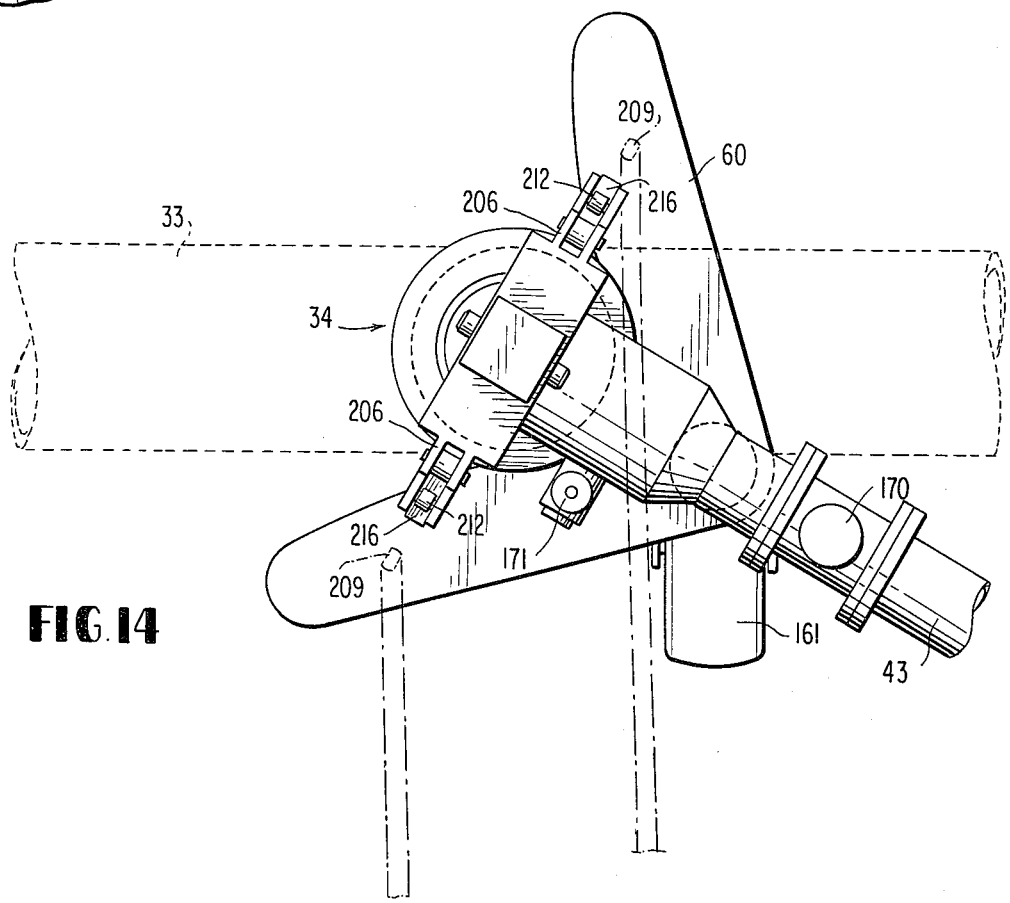
FIG. 14 is a plan view of the structure illustrated in FIG. 13 and showing the water main line in phantom.

Referring now to FIGS. 13 to 15, the details of the structure at the end of each water carrying line including the coupling members 52, 53, 54 and the special outlet valves 35 will be described in detail. In FIGS. 13 and 14 reference numeral 170 indicates an electric solenoid operated valve for opening and closing water bearing arm 43, this valve being closed at all times that the water bearing arm is not in water flow relation to an associated outlet valve 35. Reference numeral 171 indicates a solenoid operated bleeder valve the function of which will be explained below.

Since the FIG. 2 diagrammatic showing is based on the asssumption that coupling member 53 has made connection with outlet valve 35b, coupling member 52 is breaking connection with outlet valve 35a and coupling member 54 is moving toward coupling connection with outlet valve 35c, FIGS. 13, 14 and 15 will be described in reference to coupling member 54 as it enters into contiguity with outlet valve 35c. Again, however, all three water carrying arms and associated coupling apparatuses are the same and the description of one will suffice for all of them in respect to their sequential connection and disconnection from the outlet valves 35.

FIGS. 13, 14 and 15 show that the actual riser pipe in connection with the main line in each case is a pipe 173 which is protected against impact by a casing 174 filled with concrete 175. The concrete pad 38 also aids in protecting the riser structure. At its upper end riser pipe 173 carries the water outlet valve 35, which valve structure is centered in casing 174 be a reinforcing plate 176 attached to the upper end of casing 174 with a horizontal flange 177 extending around its entire periphery and projecting outwardly of the casing.

Water outlet valve 35 further comprises an enlarged housing 180 enveloping the valve structure proper, the latter consisting of a supporting spider 181 which slideably receives a valve stem 182 carrying the valve closure disc 183, spring pressed by coil spring 184 into seating engagement with valve seat 185. A cylindrical portion of the valve housing 186 extends upwardly into sealing engagement with plate 175. A groove and an internally positioned O-ring indicated at 187 are located at an intermediate point in the height of the cylindrical section.

The coupling member 54 has enlarged housing 191 which includes a cylindrical downwardly extending conduit portion 192 housing a reciprocating telescopingly received cylindrical water conducting member 193, cylindrical portion 192 having a groove and an internally positioned O-ring 194 at an intermediate point, the O-ring sealing the space between cylindrical portion 192 and cylindrical portion 193 while permitting reciprocal movement of water conducting member 193. A spider 195 carried by the uppermost portion of the water conducting member 193 slideably receives a valve actuating member or rod 197 while permitting water to pass through housing 191 to valve 170 and water carrying arm 43. Housing 191 has projecting through its wall a packing gland 199 which permits valve actuating rod 197 to extend out of the casing while permitting reciprocating movement thereof through the housing wall. A collar 201 fixedly secured to valve operating rod 197 supports cylindrical water conducting member 193 with cylindrical water conducting member 193 being slideable on valve actuating rod 197. A second collar 202 is fixedly secured on valve actuating rod 197 above spider 195 of water conducting member 193. The upper portion of valve actuating rod 197 is integral with the lower end of a piston rod 196 which after extending through packing gland 199 enters into and is joined to a piston in a hydraulic cylinder 204. A bracket 205 is fixedly secured to the lower end of cylinder 204, bracket 205 having ears 206, 206 at its outer ends for pivotally supporting a pair of depending arms 207, 207 on pins 208, 208. At their lowermost ends depending arms 207 carry inwardly projecting rollers 209, 209 designed to engage under flange 177 and rotate in respect thereto with the underside of flange 177 acting as a bearing surface. On the depending cylindrical portion 192 of housing 191 a bracket is fixedly secured having outwardly extending bifurcated arms 211, 211 forming slots through which depending arms 207 slideably pass. At the outer end portions of such slots are pins 212, 212 and on the innermost portion of such slots are two additional pins 213, 213. Pins 212 and 213 constitute camming surfaces which act on opposite sides of a pair of identical camming members 215, 215, one set of camming surfaces being indicated at 216, 216 and the other set of camming surfaces being indicated at 217, 217.

Surrounding valve piston rod 196 where it enters cylinder 204 and disposed between the lowermost end of cylinder 204 and the upper surface of packing gland 199 is a strong coil spring 220 which can be held in its compressed state when the piston rod end 196 of valve actuating rod 197 is in fully retracted position in cylinder 204.

Operation of the Embodiment of FIGS. 1 to 15

As the conveyance of the present invention moves down a path parallel to or coinciding with main line 33, guided by guide line 39, it will be evident from the drawings and the foregoing description that coupling members 52, 53 and 54 successively come into contiguity with successive risers and their associated water outlet valves, e.g., outlet valves 35a, 35b, 35c in FIG. 2. Whether the water carrying arms and water receiving manifold assembly are rotated entirely by reaction of the conveyance movement against the riser to which a coupling member is connected or whether such action is supplimented by power driven assist mechanism 88, 89, 90, each wheel 161 of outboard structure 58 of the unattached water carrying arms, being of castor design follows the path of least resistance which is an arcuate path around the water receiving manifold and pivot 85 of boom 63, as illustrated in FIG. 2. Undulations in the ground surface encountered by wheels 161 can cause some slight upward and downward movement of the water carrying arms because of the reaction between the resilience of shock absorber 162 and the resilience of tension spring 66 acting on cable 62. These movements of the water carrying arms are accommodated at swivel connections 128 and 139 and at pivot pins 106 and 113 (FIG. 8). In the case of a wheel 161 encountering a deep ground depression in its travel, the water carrying arm involved can be supported entirely on cable 62 and in case of a wheel 161 encountering a high ground elevation, shock absorber cylinder 162 can take over the weight of the arm while absorbing ground impact shock.

More specifically, FIGS. 1, 2, 3 and 4 show that as conveyance 36 follows guide line 39 along water main line 33, water carrying arm 43 will travel toward riser 35c (FIG. 2) until coupling member 54 comes into contiguity with outlet valve 35c. As this approach of coupling member 54 to outlet valve 35c occurs, the piston of hydraulic cylinder 65 will be in the extreme retracted position and coupling member 54 will be at a height above the ground greater than that of outlet valve 35c at the time wheel 161 encounters concrete pad 38. Locator member 61 will come in contact with riser casing 174 so that with continuing movement of conveyance 36 locator member 61 will guide coupling member 54 into a position with coupling member 54 directly over outlet valve 35c and aligned with outlet valve 35c in a vertical plane including outlet valve 35c and water carrying arm 41. The contact between locator member 61 and the riser casing will also actuate the control for the hydrualic fluid pressure in cylinder 65 so that the piston will extend to the other extreme position thereby lowering coupling member 54 into registry with outlet valve 35c. When locator member 61 makes contact with casing 174, the delay circuit 168 is actuated which delays opening of outlet valve 35c by hydraulic cylinder 204 until movement of coupling member 54 into registry with outlet valve 35c is completed. At this point, operating components of coupling member 54 are actuated to connect riser 34 and coupling member 54 followed by opening of outlet valve 35c approximately simultaneously with the closing of outlet valve 35b and disconnection of coupling member 53 from valve 35b, all as described in more detail below in regard to FIGS. 13 to 15.

FIGS. 13 and 14 show the coupling member, indicated generally at 54, in coupled position with the casing 174 of a riser 45. FIGS. 15A, 15B, 15C and 15D demonstrate how the components of coupling member 54 make the connection with riser casing 174, seal off the joint between the coupling member and the outlet valve 35, and open valve 35.

As will be seen in FIG. 15A, as the coupling member approaches riser 34 and is guided into vertical alignment with outlet valve 35 be locator member 61, rollers 209 are held in such spaced relation that they will clear flange 177. Additionally, the distance between rollers 209 and the lowermost edge of cylindrical coupling element 192 is appreciable and allows tolerance, if needed, relative to the height of coupling member 54 above outlet valve while still properly positioning the parts for connection. It will also be clear that coupling member 54 can approach riser 34 at a considerable height so long as locator member 61 can make contact with casing 174 of the riser.

Starting with the operating parts of coupling member 54 and outlet valve 35 as shown in FIG. 15A, the hydraulic fluid in cylinder 204 has its pressure reduced permitting coil spring 220 to push cylinder 204 and framework 205, 207 upwardly relative to arms 211. Upon such movement, cam surfaces 216, 216 move rollers 209 inwardly and as cylinder 204 and the depending framework continue to move upwardly, rollers 209 engage flange 177. Coil spring 220 is strong enough, acting through the depending framework and rollers 209 under flange 177 to hold the coupling member and outlet valve 75 in registry ready for water-tight coupling and subsequent valve opening actions, as shown in FIG. 15B.

Considering next the transition from FIG. 15B to FIG. 15C, with the coupling member in the position shown in FIG. 15B, the hydraulic fluid in cylinder 204 is increased in pressure on the upper side of the piston to extend piston rod 196 downwardly to cause collar 202 to engage spider 195 and thereby move cylindrical water conduit member 193 downwardly into the cylindrical portion 186 of outlet valve housing 180, the shamfered lower edge of cylindrical water conduit 193 assuring registry and a telescoping relationship of that part within the cylindrical portion 186 of outlet valve housing 180.

As shown in FIG. 15D, continued movement of piston rod 196 and valve actuating rod 197 carries cylindrical water conduit member 193 farther down and into sealing engagement with o-ring 187 thereby completing the sealed water flow passage between the outlet valve housing 180 and the water carrying arm, and water can flow through this passage as the completion of the movement of valve operating rod 197 pushes valve plate 183 open against the pressure of spring 184.

A water pressure sensitive control (not shown) in housing 191 in association with electronic controls back at the conveyance closes bleeder valve 171 and opens solenoid water flow control valve 170.

It will be noted that rollers 209 permit water carrying arm 43 to rotate around the riser while maintaining connection of coupling member 54 with outlet valve 35c.

Turning now to coupling member 53 which is connected to water outlet valve 35b (FIG. 2), at the time locator member 61 of arm 43 lines up coupling member 54 with outlet valve 35c, the delay signal emanating from element 168 starts the disconnect sequence of actions in coupling member 53. This is essential since conveyance 36 is continuing its onward movement.

All the coupling members and outlet valve members being identical, the showings in FIGS. 15D, 15C, 15B and 15A in that order illustrate the sequence of actions in breaking the connection between coupling member 53 and outlet valve 35b. Considering FIG. 15A it will be noted that increasing the pressure on the lower side of the piston in hydraulic cylinder 204 will compress spring 220, at the same time pulling up arms 207 and causing cam surfaces 217, 217 to spread arms 207 and disengage rollers 209 from the undersurface of flange 177, permitting coupling 53 to move away from the outlet valve 35b. Before breaking the connection, a control at outlet valve 35b and coupling member 53 acts to close the solenoid corresponding to that shown at 170 and open the bleeder valve corresponding to that shown at 171 in FIGS. 13 and 14. The bleeding action is necessary to relieve the water pressure on the valve elements, which pressure might damage these elements during their separation.

It is to be stressed that although there can be an appreciable time lag in making the connection and valve opening at an outlet valve because of the direction of movement of conveyances 36, and because a fall in water pressure in the sprinkler line for a brief time is not objectionable, the disconnection of a coupling member must be accomplished quickly, again because of the direction of movement of the conveyance. In the first instance locator member 61 will hold the coupling member aligned with the outlet valve 35c despite rotational movement of the arm but in the second instance coupling member 53 will start to move away from outlet valve 53b. Thus these connection and disconnection actions are not necessarily simultaneous but only approximately so.

Embodiments of FIGS. 16 to 18

FIGS. 16, 17 and 18 disclose a modification of that part of the present invention which relates to boom 63 and its mounting. In the modification, instead of a rotatable boom in respect to which water receiving manifold 45 follows a complex arcuate path, the water receiving manifold follows a linear path toward and away from the main line so as to accommodate the rotation of the water carrying arms as they sequentially connect with and disconnect from the risers. In the modification, where plausible, identical reference numerals are used as in the earlier described embodiment but with each reference numeral primed, and these components will not be described again unless necessary to an understanding of the modification.

In the modification of FIGS. 16, 17 and 18, water receiving manifold 45' is mounted on a rolling carriage 230 mounted on four identical rollers 231 which ride in a trackway 233 carried on a base structure indicated generally by reference numeral 235, base structure 235 being rigidly mounted on tractor 36' transversely of the path of movement of the tractor. Carriage 230 has a depending flange 236 on each side which projects downwardly below tracks 233. Base structure 235 supports a movable endless belt 237 and a connecting bar 238 which connects the depending flanges 236 to movable belt 237. A pair of rollers 239 receive around their peripheries movable belt 237 so as to permit the belt to move freely in a controlled path. The lower reach of the belt has connected to it by a bar 241 a counterweight 243, the mass of which substantially balances the weight of water receiving manifold 45' and its associated water carrying arms 41', 42', 43' and conduit 47'.

Rigid pipe 37' can be connected to a flexible hose such as hose 50' in the earlier described embodiment or a rigid jointed pipe as disclosed in FIGS. 6 and 7 but in view of the straight line movement of water receiving manifold 45' in the modification, a telescoping water carrying conduit 250 can be utilized to carry the water to the sprinkler line, not shown.

Operation of the Embodiment of FIGS. 16 to 18

In the light of the earlier described embodiment, considered from the FIG. 2 viewpoint, it will be apparent that water receiving manifold 45' in the modification moves along tracks 233 on carriage 230 as tractor 36' moves along guide line 39' with coupling member 53 coupled to its associated riser outlet valve 35b and coupling 52 disconnected from and leaving its associated riser outlet valve 35a. Carriage 230 reaches the end of its path of movement when water carrying arm 42' is normal to water main line 33' and then starts back toward its initial position as coupling member 54' approaches the next riser outlet valve 35c. Counterweight 243 is moved by belt 237 to those positions where it will counterbalance the weight of water receiving manifold 45' and associated superstructure. If desired, an electric motor 245 can assist movement of the belt, water receiving manifold 45' and counterweight 243.

Although not shown in the modification illustrated in FIGS. 16, 17 and 18, in both embodiments water receiving manifolds 45 and 45' can be maintained relatively stable and level against rolling and pitching of the conveyances 36, 36' by means of pivotal connections such as those involving pins 106 and 113 in the previously described embodiment. In the case of both embodiments, hydraulic cylinders 108 and 114 have their hydraulic fluid pressure controlled by instrumentation so as to resist to as great a degree as practicable, consistent with the movements of the water bearing arms, departures of the superstructure, i.e., the water receiving manifold and structural pipes 47, 47' from an optimum position in which pipes 47, 47' as vertical. In any event, hydraulic cylinders 108 and 114 act to exert forces at all times tending to return structural pipes 47,47' to the vertical following displacements occasioned by unevenness of the ground traversed by the conveyance.

Also in both the modification and the previously described embodiment, hydraulic cylinders 65 and 65' support the water carrying arms in an extreme upper position while the arms are unattached to a riser such upper position being high enough to clear all obstacles in the path of rotation of the arms and at a height well above the height of outlet valves 35. In the other extreme position of the water carrying arms with the piston rod of cylinder 65 or 65' extended, each arm is supported at a height above the ground slightly less than the height of the outlet valve 35 above pad 38. In either case shock absorber cylinders 162 act between wheel 161 and the end of the water carrying arm to lift the arm over any high spots in the level of the ground traversed by the apparatus where cylinders 65, 65' and cables 62, 62' holding the arms in the extreme high position nevertheless would result in an arm being damaged by impact with the ground. Where desired, cylinder 162 can be a hydraulic cylinder with its piston movable between two extreme positions as just described in respect to cylinders 65, 64' and hydraulic cylinders 62, 62' in such case can be shock absorbers instead of hydraulic cylinders so as to act as shock absorbers for the water carrying arms. Otherwise, the presence of shock absorber 162 and wheel 161 could be eliminated where cylinder 65 is the hydraulic cylinder with two extreme positions as described, so long as locator members 59, 60 and 61 are carried by the equivalent of structural member 160 on the arms below the coupling members.

In the embodiments described in the specification and shown in the drawings the conveyance 36, 36' has been termed a tractor because it is shown traveling over the surface of the ground. It will be obvious that instead of water receiving manifold 45, 45' and associated structure being supported from beneath on a ground-supported conveyance, this structure can be suspended from above on a conveyance, e.g., an additional truss similar to trusses 26, supported at the outer end by an additional tower, similar to towers 27, which truss may or may not cross the water main line and in any event be of sufficient span between towers so as not to interfere with rotation of the water bearing arms. In such case, components 56, 57 and 58 supporting the ends of the water carrying arms on the ground surface can be utilized or can be omitted where cables such as cables 62 are present. In the latter event, any unevenness of the ground being traversed by the tower wheels, such as wheels 28, is minimized by the long span of the carrying truss. It will be understood that the carrying truss, similar to truss 26, and associated towers, similar to towers 27, would constitute the conveyance in lieu of the conveyances 36, 36'.

Throughout the specification reference has been made to operation of the various parts and coordination of components of the apparatus to accomplish the functional desiderata. All the electronic and programming equipment needed for carrying out these functions are well known in the art and therefore the specification and drawings have not been complicated by their inclusion.

Although three arms are shown at 120° angular spacing, two arms could be used with gearing between them so that the 120° rotation of one arm around an outlet valve will cause a 240° rotation of the other arm to thereby bring the other arm into registry with the next riser. Alternatively, both arms could have limited angular rotation in the same direction, with twin outlet valves on each riser disposed so that the arms can pass one another in going from one twin outlet valve to the opposite twin outlet valve.

The conveyance is shown on the side of the water main line away from the sprinkler line; however, the conveyance, i.e., the apparatus carrying the water receiving manifold and water carrying arm could be located at an intermediate point on the sprinkler line or on the same side of the main line as the sprinkler line when carried by a truss and cooperating towers such as used in a sprinkler line.

I claim:

1. For use in connection with a land irrigating system in which a moving water sprinkler means having water inlet means extends laterally to and moves along the length dimension of a stationary water supply means having a plurality of water outlet valve means at spaced points along the length thereof, an apparatus for successively connecting water outlet valve means of the stationary water supply means with the water inlet means of the sprinkler means comprising conveyance means for moving along the length dimension of the stationary water supply means at the same overall rate of movement as the moving sprinkler means, water receiving conduit junction means carried by the conveyance means having water outlet means and water inlet means, a plurality of elongated water conduit means each having end portions, the elongated water conduit means each being rigid between its end portions, one end portion of each elongated water conduit means being connected for water flow to the water inlet means of the water receiving conduit junction means, the lenght of each of the elongated water conduit means being substantially less than the distance between adjacent water outlet valve means, connecting means associated with the other end portion of each elongated water conduit means for successive water flow connection and disconnection with water outlet valve means on the stationary water supply means, water flow control means for closing each elongated water conduit means to control water flow through the respective elongated water conduit means, means carried by the conveyance means supporting the water receiving conduit junction means and the associated elongated water conduit means for movement of the water receiving conduit junction means and the connecting means of the associated elongated water conduit means relative to the conveyance means and in a horizontal plane toward and away from successive water outlet valve means, articulated connecting water conduit means having a water inlet end portion pivotally connected to the water outlet means of the water receiving conduit junction means and a water outlet end portion pivotally connected to the water inlet means of the sprinkler means for water flow from the water receiving conduit junction means to the water inlet means of the sprinkler means, the articulated connecting water conduit means being pivotally jointed intermediate its end portions whereby the distance between the water receiving conduit junction means and the water inlet means of the sprinkler means can vary to accommodate movement of the conveyance means relative to a water outlet valve means to which an elongated water conduit is connected.

2. The apparatus defined in claim 1 wherein said water flow control means comprises a one-way valve connected in each elongated water conduit means, the one-way valves permitting free flow of water through the elongated water conduit means in a direction from the connecting means to the water receiving conduit junction means and preventing flow in the opposite direction.

3. For use in connection with a land irrigating system in which a moving water sprinkler means having water inlet means extends laterally to and moves along the length dimension of a stationary water supply means having a plurality of water outlet valve means at equally spaced points along the length thereof, an apparatus for successively connecting water outlet valve means of the stationary water supply means with water inlet means of the sprinkler means comprising conveyance means for moving along the length dimension of the stationary water supply means at the same overall rate of movement as the moving sprinkler means, water receiving conduit junction means carried by the conveyance means having water outlet means and water inlet means, a plurality of elongated water conduit means each having end portions, the elongated water conduit means each being rigid between its end portions, one end portion of each elongated water conduit means being connected for water flow to the water inlet means of the water receiving conduit junction means, the length of each of the elongated water conduit means being substantially less than the distance between adjacent water outlet valve means, connecting means associated with the other end portion of each elongated water conduit means for successive water flow connection and disconnection with water outlet valve means on the stationary water supply means, water flow control means for closing each elongated water conduit means to control water flow through the respective elongated water conduit means, elongated track means carried by said conveyance means, carriage means mounted on the elongated track means supporting the water receiving conduit junction means for movement therealong in a straight line, such movement of the water receiving conduit junction means resulting in movement of the connecting means and the associated elongated water conduit means in a horizontal plane toward and away from successive water outlet valve means, and connecting water conduit means having a water inlet end portion pivotally connected to the water outlet means of the water receiving conduit junction means and a water outlet end portion connected to the water inlet means of the sprinkler means for water flow from the water receiving conduit junction means to the water inlet means of the sprinkler means, the connecting water conduit means including means for accommodating movement of the water receiving conduit junction means relative to the water inlet means of the sprinkler means.

4. For use in connection with a land irrigating system in which a moving water sprinkler means having water inlet means extends laterally to and moves along the length dimension of a stationary water supply means having a plurality of water outlet valve means at spaced points along the length thereof, an apparatus for successively connecting water outlet valve means of the stationary water supply means with the water inlet means of the sprinkler means comprising conveyance means for moving along the length dimension of the stationary water supply means at the same overall rate of movement as the moving sprinkler means, water receiving conduit junction means carried by the conveyance means having water outlet means and water inlet means, a plurality of elongated water conduit means each having end portions, the elongated water conduit means each being rigid between said end portions and having one of said end portions connected for water flow to the water inlet means of the water receiving conduit junction means, water outlet valve connector means associated with the other said end portion for connecting each said elongated water conduit means with the water outlet valve means, the length of each elongated water conduit means being substantially less than the distance between adjacent water outlet valves means, connecting means associated with the other end portion of each elongated water conduit means for successive water flow connection and disconnection with water outlet valve means on the stationary water supply means, water flow control valve means connected in each elongated water conduit means to control water flow therethrough between the water outlet valve means and the water receiving conduit junction means, meand carried by the conveyance means supporting the water receiving conduit junction means and associated elongated water conduit means for movement of the water receiving conduit junction means and the connecting means of the associated elongated water conduit means in a horizontal plane relative to the conveyance means and toward and away from successive water outlet valve means, articulated connecting water conduit means having a water inlet end portion pivotally connected to the water outlet means of the water receiving conduit junction means and a water outlet end portion pivotally connected to the water inlet means of the sprinkler means for water flow from the water receiving conduit junction means to the water inlet means of the sprinkler means, the articulated water conduit means being pivotally jointed intermediate its end portions whereby the distance between the water receiving conduit junction means and the water inlet means of the sprinkler means can vary to accommodate movement of the conveyance means relative to a water outlet valve means to which an elongated water conduit is connected.

5. The apparatus defined in claim 4 wherein said water flow control valve means comprises a one-way valve connected each said elongated water conduit means, the one-way valve permitting free flow of water through the elongated water conduit means in a direction from the connecting means to the water receiving conduit junction means and preventing flow in the opposite direction.

6. The apparatus defined in claim 5 further comprising pressure relief valve means connected with each said elongated water conduit means between said water flow control valve means and said other end, said pressure relief valve means being operable to relieve pressure in each said elongated water conduit means between said water flow control valve means and said other end.

7. For use in connection with a land irrigating system in which a moving water sprinkler means having water inlet means extends laterally to and moves along the length dimension of a stationary water supply means having a plurality of water outlet valve means at equally spaced points along the length thereof, an apparatus for successively connecting water outlet valve means of the stationary water supply means with water inlet means of the sprinkler means comprising conveyance means for moving along the length dimension of the stationary water supply means at the same overall rate of movement as the moving sprinkler means, water receiving conduit junction means carried by the conveyance means having water outlet means and water inlet means, a plurality elongated water conduit means each having end portions, each elongated water conduit means being rigid between said end portions and having one of said end portions connected for water flow to the water inlet means of the water receiving conduit junction means, the length of each elongated water conduit means being substantially less than the distance between adjacent water outlet valve means, connecting means associated with the other of said end portions of each elongated water conduit means for successive water flow connection and disconnection with water outlet valve means on the stationary water supply means, water flow control means for closing each elongated water conduit means to control water flow through the respective elongated water conduit means, elongated track means carried by said conveyance means carriage means mounted on the elongated track means supporting the water receiving conduit junction means for movement therealong in a straight line, such movement of the water receiving conduit junction means resulting in movement of the connecting means of the associated elonated water conduit means in a horizontal plane toward and away from successive water outlet valve means, and connecting water conduit means having a water inlet end portion pivotally connected to the water outlet means of the water receiving conduit junction means and a water outlet end portion connected to the water inlet means of the sprinkler means for water flow from the water receiving conduit junction means to the water inlet means of the sprinkler means, the connecting water conduit means including means for accommodating movement of the water receiving conduit junction means and of said elongated each conduit means relative to the water inlet means of the sprinkler means.

* * * * *